US012794900B2

(12) United States Patent
Najumudeen et al.

(10) Patent No.: US 12,794,900 B2
(45) Date of Patent: Nov. 10, 2026

(54) SYSTEM AND METHOD FOR MULTIMODAL ARTIFICIAL INTELLIGENCE-BASED AUTHENTICATION CONTROLLER

(71) Applicant: BANK OF AMERICA CORPORATION, Charlotte, NC (US)

(72) Inventors: Syed Najumudeen, Hyderabad (IN); Suresh Kumar Anbarasan, Chennai (IN); Ranjeev Arul David, Madurai (IN); Vasuki Anand, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 58 days.

(21) Appl. No.: 19/070,107

(22) Filed: Mar. 4, 2025

(65) Prior Publication Data

US 2026/0270272 A1 Sep. 10, 2026

(51) Int. Cl.
*H04L 9/40* (2022.01)

(52) U.S. Cl.
CPC ........ *H04L 63/108* (2013.01); *H04L 63/0807* (2013.01)

(58) Field of Classification Search
CPC .............. H04L 63/108; H04L 63/0807; G06N 20/00; G06N 5/01; G06N 7/01
USPC .............................................................. 726/4
See application file for complete search history.

(56) References Cited

U.S. PATENT DOCUMENTS 9,838,203 B1 12/2017 Kisley
10,417,575 B2 * 9/2019 Nowozin ............... G06N 20/20
10,796,337 B2 10/2020 Wee
11,240,040 B2 2/2022 Wentz
11,244,340 B1 * 2/2022 Morin ................... G06F 18/214
(Continued)

OTHER PUBLICATIONS

Ergu, et al., The analytic hierarchy process: task scheduling and resource allocation in cloud computing environment. J Supercomput 64, 835-848 (2013). https://doi.org/10.1007/s11227-011-0625-1.*
(Continued)

*Primary Examiner* — Lizbeth Torres-Diaz
(74) *Attorney, Agent, or Firm* — Moore & Van Allen PLLC; Nicholas C. Russell

(57) ABSTRACT

Systems, computer program products, and methods are described herein for multimodal artificial intelligence (AI)-based authentication controller. The present disclosure is configured to identify a ticket for a task request, wherein the ticket stores tasks for completion of computational resource management; identify all tasks on the network environment for the task request of the ticket and simulate all the tasks, via an AI-based simulation, to determine computational resources to perform all the tasks; identify secondary computational resources, wherein the secondary computational resources have interdependencies or hierarchical relationships with the computational resources; assign users to each of the identified computational resources and each of the identified secondary computational resources via a clustered decision-making model; and generate a token for all the assigned users to the assigned computational resources or the assigned secondary computational resources, wherein the token is configured to expires upon completion of the computational resource management.

20 Claims, 6 Drawing Sheets

(56) References Cited

U.S. PATENT DOCUMENTS

| | | | | |
|---|---|---|---|---|
| 11,263,241 | B2 * | 3/2022 | Rezaeian | G06F 16/285 |
| 2014/0173274 | A1 | 6/2014 | Chen | |
| 2018/0211270 | A1 | 7/2018 | Wu | |
| 2020/0311559 | A1 * | 10/2020 | Chattopadhyay | G06N 5/01 |
| 2021/0144517 | A1 * | 5/2021 | Guim Bernat | H04L 41/0843 |
| 2023/0066706 | A1 * | 3/2023 | Burhani | G06N 3/006 |
| 2024/0179140 | A1 * | 5/2024 | Little | H04L 63/10 |
| 2024/0179684 | A1 | 5/2024 | Mo | |
| 2024/0184917 | A1 | 6/2024 | Fakhraie | |
| 2024/0187219 | A1 | 6/2024 | Childe | |
| 2024/0187262 | A1 | 6/2024 | Armour | |
| 2026/0105438 | A1 * | 4/2026 | Cella | G06Q 20/36 |
| 2026/0148553 | A1 * | 5/2026 | Park | G06V 20/44 |

OTHER PUBLICATIONS

Lekkala, Chandrakanth, AI-Driven Dynamic Resource Allocation in Cloud Computing: Predictive Models and Real-Time Optimization (Feb. 6, 2024). J Artif Intell Mach Learn & Data Sci | vol. 2 & Iss: 2, Available at SSRN: https://ssrn.com/abstract=4908420 or http://dx.doi.org/10.2139/ssrn.4908420.*

* cited by examiner

SYSTEM AND METHOD FOR MULTIMODAL ARTIFICIAL INTELLIGENCE-BASED AUTHENTICATION CONTROLLER

TECHNOLOGICAL FIELD

Example embodiments of the present disclosure relate to a multimodal artificial intelligence (AI)-based authentication controller system.

BACKGROUND

Many companies, institutions, or organizations provide their workforce with access to internal systems as part of their designated roles and responsibilities. To mitigate security concerns and ensure compliance, governance routines are established to facilitate periodic reviews and approvals of access privileges. However, in many cases, access is granted on a permanent basis, increasing the likelihood of intentional misuse of access rights or unintended security weaknesses resulting from human error or a limited understanding of system functions. These vulnerabilities can lead to unintended disruptions, security breaches, or operational failures. Therefore, a need exists for a system and method utilizing a multimodal artificial intelligence-based authentication controller to effectively manage access to the internal systems.

BRIEF SUMMARY

Systems, methods, and computer program products are provided for a multimodal AI-based authentication controller.

In one aspect, a system for multimodal AI-based authentication controller system is provided. In some embodiments, the system may comprise: a memory device with computer-readable program code stored thereon; and at least one processing device operatively coupled to the at least one memory device, wherein executing the computer-readable code is configured to cause at least one processing device to: identify a ticket for a task request, wherein the ticket stores tasks associated with the task request for completion of computational resource management that requires timed authorized access to computational resource within a network environment; identify all tasks on the network environment for the task request of the ticket and simulate all the tasks, via an AI-based simulation, to determine computational resources to perform all the tasks; identify secondary computational resources via a hierarchical decision model, wherein the secondary computational resources have interdependencies or hierarchical relationships with the computational resources to perform all the tasks; assign at least one user to each of the identified computational resources and each of the identified secondary computational resources via a clustered decision-making model; and generate a token with timed authentication access for all the assigned users to the assigned computational resources or the assigned secondary computational resources to complete all the tasks, wherein the token expires upon completion of the computational resource management.

In some embodiments, the ticket is generated from a ticket management module that is configured to receive the task request and to store tasks associated with the task request, wherein the task request comprises completion of computational resource management comprising an unexpected failure, a service-oriented request, or a planned activity associated with the computational resource management within the network environment.

In some embodiments, the AI-based simulation is using process mapping data and system engagement log data from past tasks associated with all the tasks, wherein the process mapping data comprises procedural pathways and sequences of the past tasks, wherein the system engagement log data comprises activity records of the computational resources of the past tasks.

In some embodiments, the AI-based simulation is further configured to identify at least one user for each of the identified computational resource based on a subject matter expert (SME) index score and an authorization to access and utilize the corresponding identified computational resource, wherein the hierarchical decision model is further configured to identify at least one secondary user for each of the identified secondary computational resource based on the SME index score and an authorization to access and utilize the corresponding identified secondary computational resource, wherein the SME index score represents the level of the user's expertise in relation to the computational resource or the secondary computational resource, wherein the clustered decision-making model is further configured to assign at least one user for the corresponding identified computational resource from the at least one identified user and assign at least one secondary user for the corresponding identified secondary computational resource from the at least one identified secondary user.

In some embodiments, the hierarchical decision model is pretrained with a decision tree model using computational resource dependency maps comprising information of the interdependencies or the hierarchical relationships between computational resources within the network environment.

In some embodiments, the clustered decision-making model is further configured to assign at least one user to each of the identified computational resources and to each of the identified secondary computational resources based on parameters to the assigned computational resource or the assigned secondary computational resource, wherein the parameters comprises a user's availability, an a SME index score, an authorization to access and utilize, or a record of the assigned user from past tasks associated with all the tasks.

In some embodiments, the clustered decision-making model is pretrained with a cluster bandits model.

In some embodiments, the token is configured to expire at a predefined time, the predefined time being determined by the AI-based task simulation.

In some embodiments, the token is generated via a trusted computing compiler, wherein the trusted computing compiler is configured to: identify procedures of authentication for the identified computational resources and for the identified secondary computational resources; and generate the token with timed authentication access for all the assigned users to the assigned computational resources or the assigned secondary computational resources to complete all the tasks based on the identified procedures of authentication.

In some embodiments, the trusted computing compiler is further configured to: detect an access request to an unauthorized computational resource with the token; and generate an unauthorized access report associated with the access request.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made to the accompanying drawings. The components illustrated in the figures may or may not be present in certain embodiments described herein. Some embodiments may include fewer (or more) components than those shown in the figures.

Figure 1A:
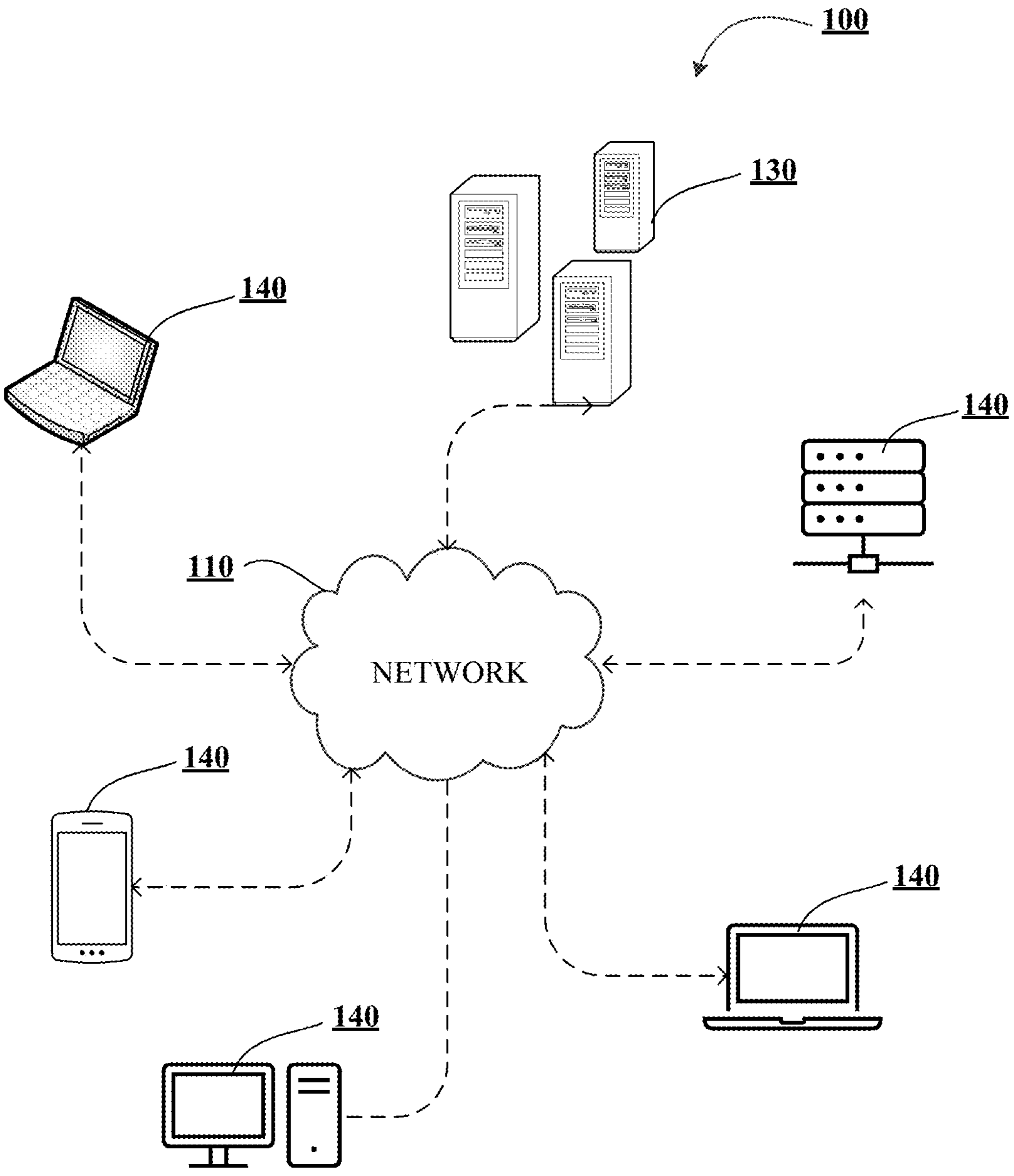
Figure 1B:
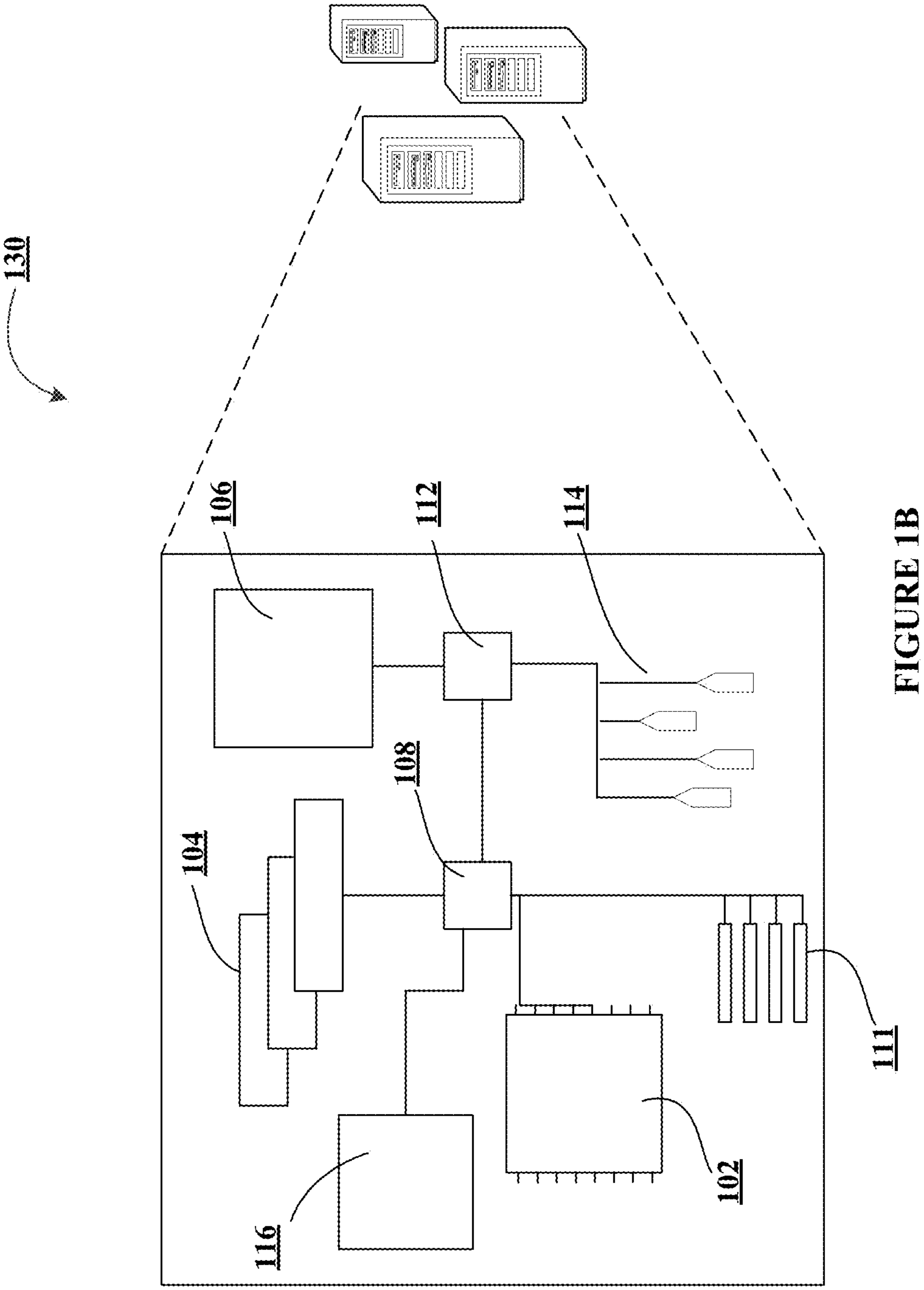
Figure 1C:
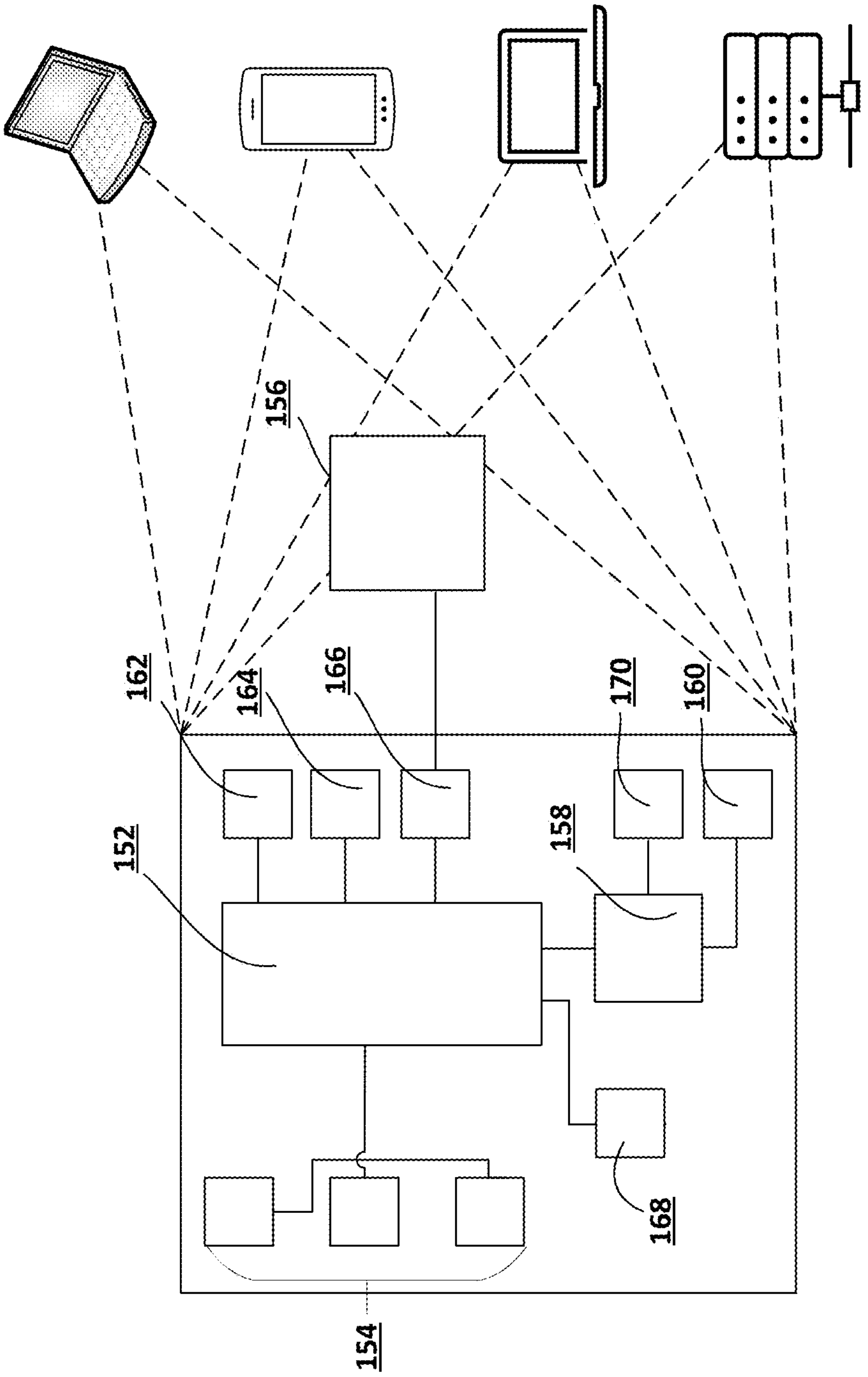

FIGS. 1A-1C illustrates technical components of an exemplary distributed computing environment for multimodal AI-based authentication controller system, in accordance with an embodiment of the disclosure.

Figure 2:
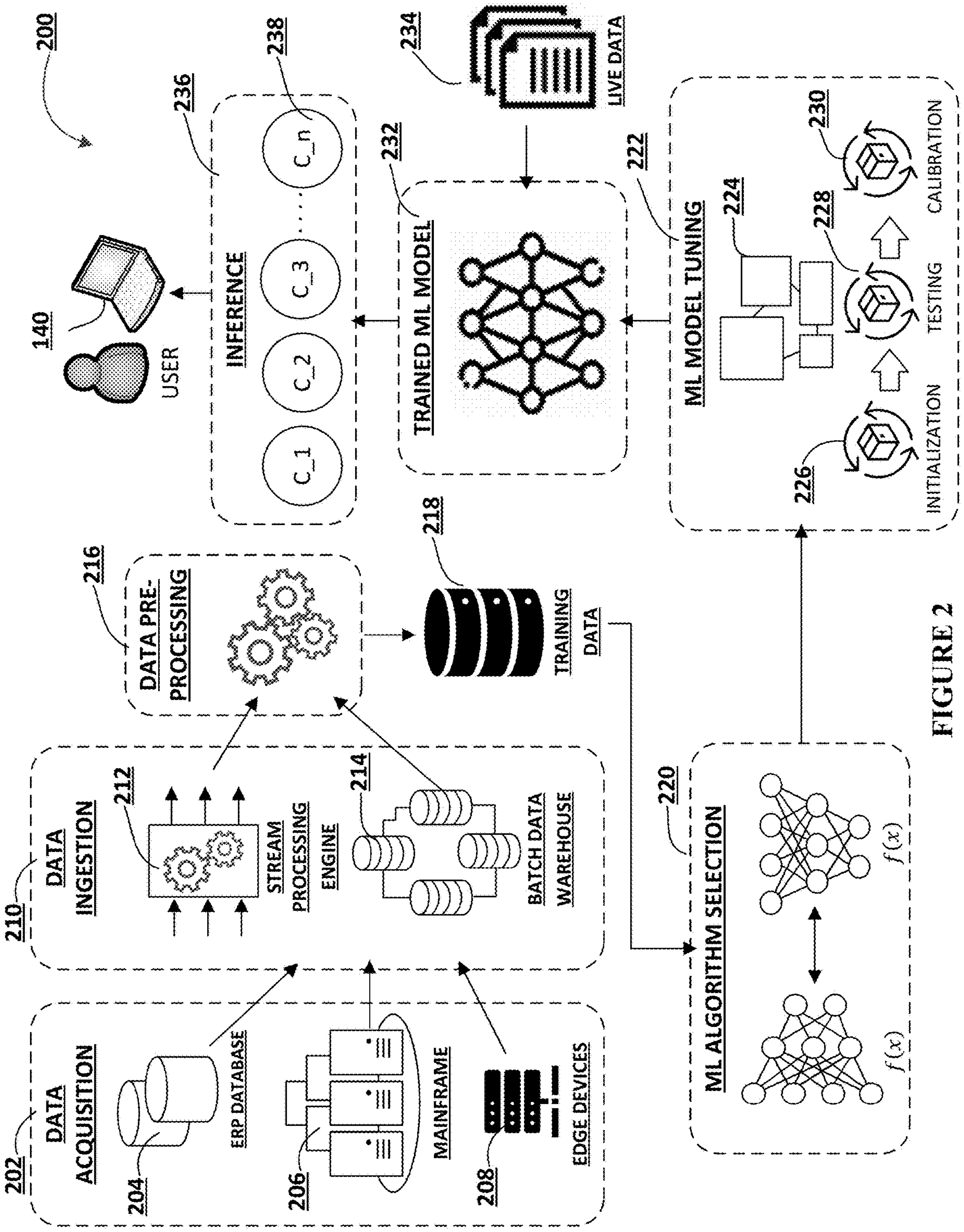

FIG. 2 illustrates an exemplary machine learning (ML) subsystem architecture, in accordance with an embodiment of the disclosure.

Figure 3:
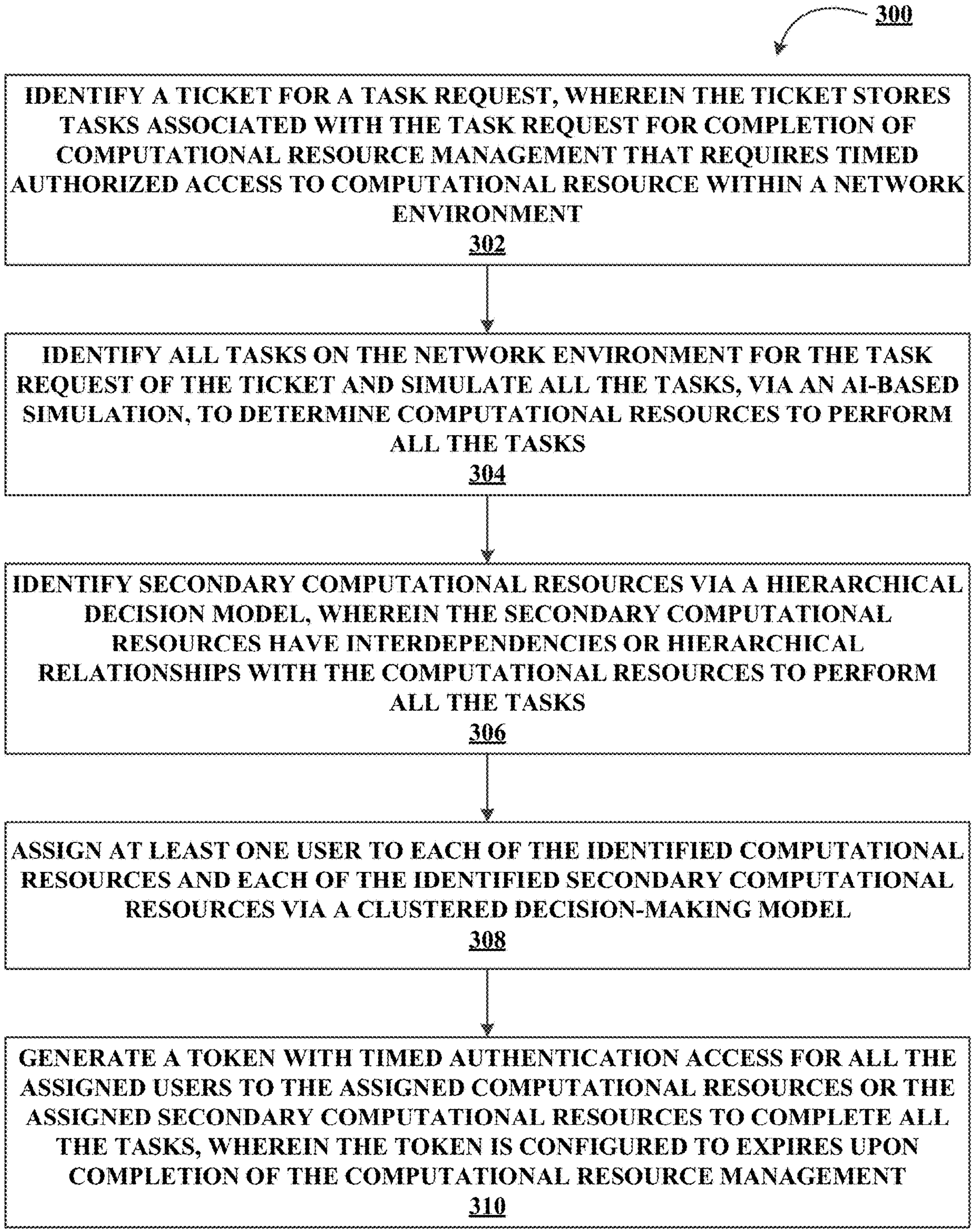

FIG. 3 illustrates a process flow for a multimodal authentication controller system, in accordance with an embodiment of the disclosure.

Figure 4:
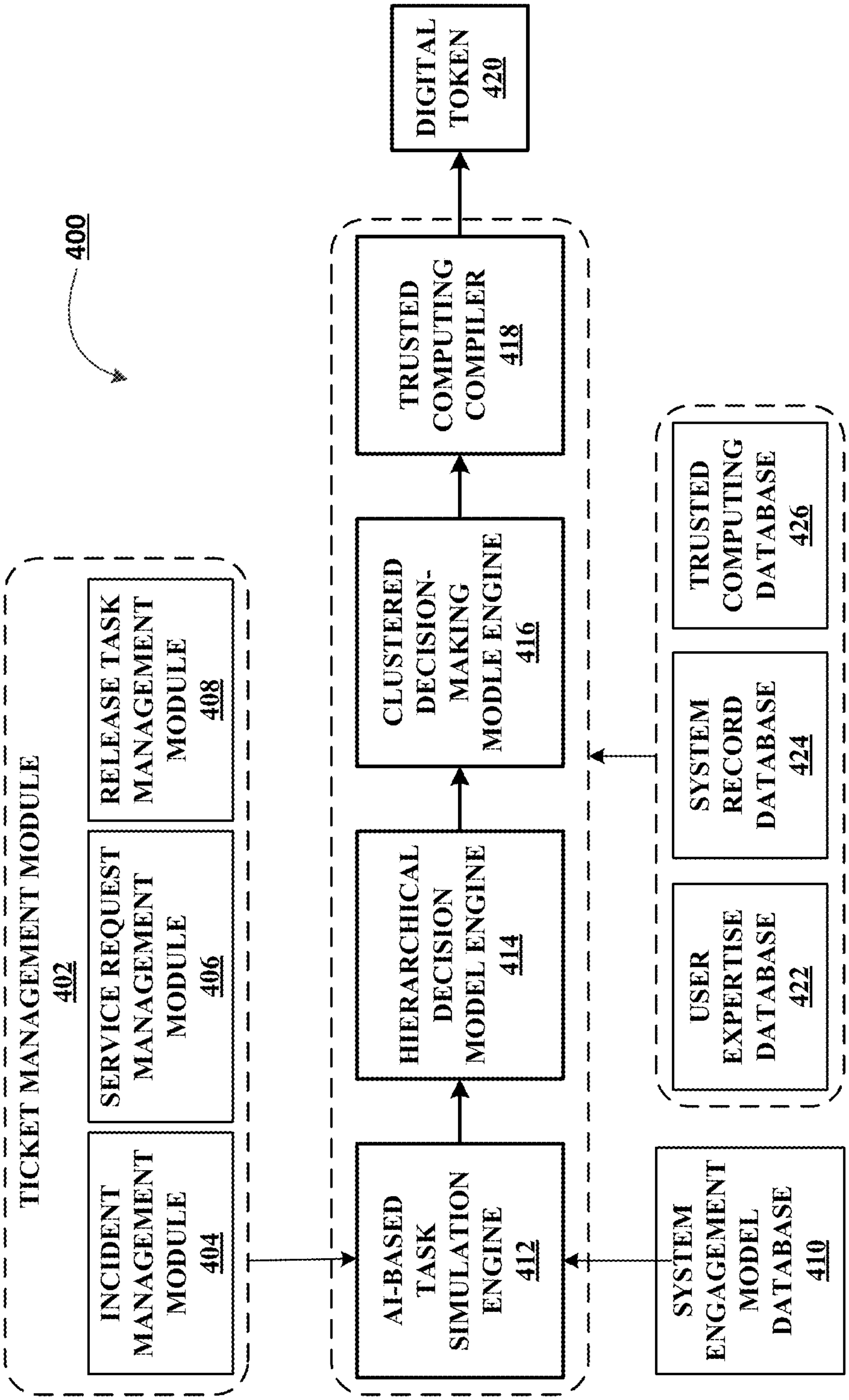

FIG. 4 illustrates an example multimodal authentication controller system diagram, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, “authentication credentials” may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an “interaction” may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word “exemplary” is used herein to mean “serving as an example, instance, or illustration.” Any implementation described herein as “exemplary” is not necessarily to be construed as advantageous over other implementations.

As used herein, “determining” may encompass a variety of actions. For example, “determining” may include calculating, computing, processing, deriving, investigating, ascertaining, and/or the like. Furthermore, “determining” may also include receiving (e.g., receiving information), accessing (e.g., accessing data in a memory), and/or the like. Also, “determining” may include resolving, selecting, choosing, calculating, establishing, and/or the like. Determining may also include ascertaining that a parameter matches a predetermined criterion, including that a threshold has been met, passed, exceeded, and so on.

As used herein, an "engine" may refer to core elements of an application, or part of an application that serves as a foundation for a larger piece of software and drives the functionality of the software. In some embodiments, an engine may be self-contained, but externally controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "module" refers to a functional component or unit configured to perform one or more specified tasks. The module may be implemented in hardware, software, firmware, or any combination thereof. In some embodiments, the module may include one or more processors, memory elements, or computer-readable instructions that, when executed, cause the module to perform the described functionality. The module can operate independently or in conjunction with other modules within the system, communicating via predefined interfaces, communication protocols, or data exchange mechanisms. Modules may be arranged in a distributed or centralized architecture and may be dynamically reconfigurable or adaptive to changing conditions or inputs.

As used herein, the "computational resource" refers to one or more hardware, software, or digital infrastructure components utilized for the operation, maintenance, management, or diagnosing of networks and systems. Computational resources may include, but are not limited to, servers, databases, systems, applications, software, programs, and scripts, which collectively support data processing, network management, system diagnostics, and operational execution within an enterprise or computing environment. The computational resources may be secured and access-controlled, requiring authentication credentials for authorized use. Authentication mechanisms may comprise username-password authentication, multi-factor authentication (MFA), cryptographic keys, digital certificates, digital tokens, access control policies that regulate interactions with the computational resources, and/or the like. Access to such resources may be restricted based on predefined security policies, role-based access control (RBAC), privilege levels, or dynamic authentication protocols, thereby ensuring that only authorized users may utilize, modify, or interact with the computational resources.

In contemporary IT environments, entities operate IT systems and IT infrastructures to support their activities. To manage these computational resources, entities grant access to the users based on their designated roles and responsibilities and establish governance routines to facilitate periodic reviews and approvals of access privileges. Nevertheless, access is often granted on a permanent basis, which may lead to the intentional misuse of access rights or unintended security vulnerabilities resulting from human error or a limited understanding of system functions.

As used herein, the "ticket" refers to a formalized request or a digital record that comprises necessary details about tasks or issues that needs to be addressed. The ticket may include structured and/or unstructured data, such as task description, priority level, requirements (e.g., any specific equipment, skills, or computational resources needed), constraints (e.g., time limit, budgets, and/or the like), contextual information (e.g., additional data that helps clarify the nature of the task), and/or the like. The ticket may comprise multiple tasks associated with a task request and may be utilized as a foundational unit for initiating, managing, and completing the task requests by monitoring the progress and updating statues. In some embodiments, the multimodal AI-based authentication controller system may analyze the requirements of the tasks, determine the necessary computational resources and match the task with appropriate users.

To address this, an authentication control system may be introduced to grant users access to computational resources for given tasks. The system is configured to identify all necessary computational resources and optimal users who possess the required proficiency and security level for those resources using pretrained machine learning process. Additionally, the system generates a digital token that comprises a cryptographic credential, which exclusively grants selected users access to the identified computational resources. The digital token is configured to expire upon completion of the task request, ensuring that access to the computational resources is limited to a specific duration.

Accordingly, the present disclosure describes a multimodal AI-based authentication control system that receives a ticket comprising tasks associated with a task request and identifies required computational resources and users to process the tasks using an AI-based task simulation. Then, the system further identifies secondary computational resources that support the identified computational resources and secondary users to operate the secondary computational resources using a hierarchical decision model. Further, the system is configured to verify user's authorization to access and utilize the identified computational resource and secondary user's authorization to access and utilize the secondary computational resource and determines assigned user and assigned secondary user among the verified users and secondary users. Subsequently, the system generates a digital token that grants access to each of the identified computational resources for the assigned users and to each of the secondary computational resources for the secondary assigned users. The digital token is configured to expire upon completion of the task request ensuring control of the authentication to the computational resources and secondary computational resources.

FIGS. 1A-1C illustrate technical components of an exemplary distributed computing environment 100 for the AI-based multimodal authentication control system, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

In some embodiments, the multimodal AI-based authentication controller system may be embedded to the system 130 to manage user access to the computational resources within the system 130. The multimodal AI-based authentication controller system may utilize the components of system 130 or part of the components to execute multimodal authentication control process. In some embodiments, the multimodal AI-based authentication controller system may be an independent system and operatively coupled to the system 130 to execute the multimodal authentication control process managing the user access to the system 130.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, or the like), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, AdaBoost, stacked generalization, gradient boosting machine method, random forest method, or the like), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

The multimodal AI-based authentication controller system is configured to utilize part or all of the machine learning subsystem 200 to execute machine learning process or algorithms in the system to execute the multimodal authentication control process.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for the multimodal authentication control process, in accordance with an embodiment of the disclosure. In some embodiments, the system may perform one or more of the steps of process flow 300.

As shown in block 302, the process flow 300 may include the step of identifying a ticket for a task request, wherein the ticket stores tasks associated with the task request for completion of computational resource management that requires timed authorized access to computational resource within a network environment. For example, and in some embodiments, the multimodal AI-based authentication controller system may receive a ticket from a ticket management module that receives task requests or issues associated with the network 110, the system 130, the end-point device 140, or systems that is operatively coupled to the network 110, the system 130, or the end-point device 140. The ticket may comprise multiple tasks associated with the task request and may be utilized as a foundational unit for initiating, managing, and completing the task requests by monitoring the progress and updating statues.

In some embodiments, the ticket management module may comprise multiple sub-modules, each having a different receiving source and addressing different aspects of the task request, such as an incident management module, a service request management module, a release task management module, and/or the like. The incident management module may receive a task request associated with unexpected issues or problems (e.g., system outages, hardware or software failures, security incidents, unexpected end-point user interactions associated with the system 130, and/or the like) and may generate a ticket associated with the received unexpected issues. The service request management module may manage a task request associated with a service-oriented request that is not urgent or unexpected but is required to fulfill routine or operational demands and may generate a ticket associated with the received service-oriented. The release task management module may receive planned activities or ongoing tasks that need to be executed in a controlled manner, providing information about upcoming releases, deployments, or tasks that are part of larger projects or operational cycles, and may generate a ticket associated with the received task request.

As shown in block 304, the process flow 300 may include the step of identifying all tasks on the network environment for the task request of the ticket and simulate all the tasks, via an AI-based simulation, to determine computational resources to perform all the tasks. For example, and in some embodiments, the system may be configured to extract all the tasks associated with the task request from the ticket and utilize an AI-based task simulation employing a pretrained machine learning process that is based on system engagement models comprising the process mapping information and the system engagement logs. The AI-based simulation identifies computational resources necessary to perform all the tasks and to estimate a processing time required to complete all the task. Moreover, the AI-based task simulation is configured to identify users that are authorized to use and skilled in operating the identified computational resources.

The process mapping information may comprise structured data representing detailed procedural pathways and sequences associated with the execution of computational tasks. The process mapping information may comprise comprehensive historical records of previously executed processes and their corresponding process flows, wherein each process flow outlines a systematic sequence of operations, subprocesses, and decision points involved in the completion of a task request. Additionally, process mapping information may comprise timing data and duration metrics for individual subprocesses.

The system engagement logs may comprise structured records systematically capturing events, interactions, and operational activities occurring within the computational resource during execution of the task. The logs may comprise timestamped data entries that provide a chronological account of system events, user interactions, and/or the like. Each log entry may detail the initiation and termination times of tasks, including execution durations, completion statuses (e.g., successful or unsuccessful), and any resultant system outputs or responses.

In some embodiments, the multimodal AI-based authentication controller system may store the process mapping information or the system engagement logs in internal databases or receive the process mapping information or the system engagement logs from the external systems or external databases.

In some embodiments, the AI-based task simulation may identify the computational resources using a pretrained machine learning model or algorithm (e.g., machine learning algorithm 220). In combination with the process mapping information and the system engagement logs, the AI-based task simulation is configured to extract and identify the computational resources necessary to execute the task request and to estimate the associated processing time by employing the machine learning process.

In some embodiments, the user expertise to a computational resource may be evaluated with a subject matter expert (SME) index score. The SME index score is a quantified metric determined based on one or more expertise-related parameters associated with a subject matter expert (SME), wherein the expertise-related parameters are derived from historical data, user interactions, performance evaluations, or other competency indicators associated with the computational resources or past task executions. The system is configured to identify at least one user for each identified computational resource based on the user's SME index score and the user's authorization to access and utilize the identified computational resource.

In some embodiments, information pertaining to user expertise (e.g., SME index score) associated with computational resources, along with authentication data indicative of a user's authorization to access and utilize the computational resources, may be stored in a database. The database may further comprise user credential information, historical performance metrics for prior tasks, user roles and permissions data, records of previous task request allocations, access logs, audit trails, security clearance information, and user availability status. The database may be external or integrated within a multimodal AI-based authentication controller system. The authentication controller system is configured to access the database and retrieve user expertise information, authentication status data, and other pertinent stored information associated with one or more computational resources identified for executing a task request.

As shown in block 306, the process flow 300 may include the step of identifying secondary computational resources via a hierarchical decision model, wherein the secondary computational resources have interdependencies or hierarchical relationships with the computational resources to perform all the tasks. For example, and in some embodiments, the system may using a hierarchical decision model to identify at least one secondary computational resource associated with the identified computational resource and at least one secondary user associated with the secondary computational resource based on an secondary user's expertise and an authentication to the secondary computational resource, wherein the hierarchical decision model is a supervised machine learning process configured to identify the secondary computational resource based on computational resource dependency maps.

In some embodiments, a computational resource dependency map comprises a structured representation detailing interdependencies, hierarchies, and relational structures among computational resources within the system 130. The computational resource dependency map defines prerequisite conditions, hierarchical orders, sequential dependencies, and relational structures associated with computational resources, including but not limited to processing units, memory modules, storage devices, software components, network infrastructure, and databases. Additionally, the dependency map may indicate resource allocation constraints, failover mechanisms, parallel processing capabilities, and interoperability dependencies between computational resources. By integrating the computational resource dependency map, the system is configured to utilize a supervised machine learning process, comprising hierarchical decision models, to identify any secondary computational resources unidentified by the AI-based task simulation. The identified secondary computational resources may reside in different zones, such as distinct data centers or disparate application sets, relative to the initially identified computational resources. The aggregated set of the initially identified computational resources and the additional computational resources forms an encapsulated access zone that may encompass multiple distinct zones. In some embodiments, the computational resource dependency map may be stored in a secure database, or a dedicated computational resource management system, either internally within the multimodal AI-based authentication controller system or externally in an external storage infrastructure.

Then, the system is configured to identify at least one secondary user for each identified secondary computational resource based on the additional user's SME index score to the secondary computational resource and the secondary user's authorization to access and utilize the secondary computational resource. In certain cases, the secondary computational resources may be unidentified by the hierarchical decision model if the AI-based task simulation has already identified all the computational resources necessary to perform the tasks. Accordingly, the system may skip identifying secondary users associated with such unidentified secondary computational resources.

In some embodiments, the hierarchical decision model may identify the secondary computational resources using a supervised machine learning model or algorithm (e.g., machine learning algorithm 220). Such a machine learning algorithm may be selected from: decision tree algorithms, such as Classification and Regression Tree (CART), ID3 & C4.5/C5.0, and/or the like; ensemble decision tree models, such as Random Forests, Gradient Boosted Trees, Adaptive Boosting, and/or the like; hierarchical classification models, such as Hierarchical Support Vector Machines (Hierarchical SVM), Hierarchical Neural Networks (HNN), and/or the like; rule-based hierarchical models such as Chi-square Automatic Interaction Detection (CHAID) and/or the like.

As shown in block 308, the process flow 300 may include the step of assigning at least one user to each of the identified computational resources and each of the identified secondary computational resources via a clustered decision-making model. For example, and in some embodiments, the system may use a clustered decision-making model to determine at least one assigned user for each identified computational resource and at least one assigned secondary user for each identified secondary computational resource, wherein the clustered decision-making model is a machine learning process configured to determine the assigned user from a set of one or more identified users based on identified user's record associated with the past tasks and the assigned secondary user from a set of one or more identified secondary users based on secondary user's record associated with the past tasks.

In some embodiments, a clustered decision-making model may be configured to utilize machine learning algorithms to determine at least one optimal user to utilize each computational resource for processing the task request and to assign the at least one optimal user to the associated computational resource based on user records (e.g., historical performance metrics for prior tasks, records of previous task request allocations, user availability status, and/or the like) of past tasks associated with the tasks. Similarly, the authentication controller system is configured to determine at least one optimal secondary user for any identified secondary computational resource to process the task request and to assign the at least one optimal secondary user to each identified secondary computational resource using the clustered decision-making model, wherein the determination is based on past records of the additional user.

In some embodiments, the clustered decision-making model may be pretrained using a machine learning algorithm 220. The machine learning algorithm may employ structured and hierarchical bandit models from Multi-Armed Bandit (MAB) frameworks, such as a cluster bandits model or algorithm, which groups similar arms (e.g., users) into clusters (e.g., assigning users to computational resources) to generalize learning across related entities. The clustered decision-making model may be configured to determine at least one optimal user for each computational resource based on user records associated with the computational resource and the tasks. For instance, the model may consider an SME index score associated with the computational resource, past user engagement records associated with the tasks or similar tasks, user availability for the computational resource, the required number of users for the computational resource, and/or other relevant parameters.

In certain cases, the clustered decision-making model may be configured to assign any secondary assigned user only when the hierarchical decision model identifies any secondary user for each of the identified secondary computational resource, wherein the secondary computational resource may be unidentified if the AI-based task simulation has already identified all the computational resources necessary to execute all the tasks. Accordingly, the system may skip assigning any secondary users associated with such unidentified secondary computational resources.

As shown in block 310, the process flow 300 may include the step of generating a token with timed authentication access for all the assigned users to the assigned computational resources or the assigned secondary computational resources to complete all the tasks, wherein the token expires upon completion of the computational resource management. For example, and in some embodiments, the system may generate a digital token associated with all the tasks using a trusted computing compiler configured to allow accessing the assigned user to the computational resource and allow accessing the assigned secondary user to the secondary computational resource, wherein the digital token is generated to expires upon completion of the tasks.

In some embodiments, the trusted computing compiler is configured to identify authentication procedures for the assigned user to the corresponding identified computational resource and for the assigned secondary user to the corresponding identified secondary computational resource based on access control information. The trusted computing compiler is configured to generate the digital token for regulating access for the assigned user to the identified computational resource and for the assigned secondary user to the identified additional computational resources. The trusted computing compiler is a security-enhanced compilation framework that verifies authentication credentials, enforces access control policies, and/or generates a digital token encoding access permissions for the assigned user and the assigned secondary user based on the access control information.

In some embodiments, the access control information comprises authentication-related data used to regulate and manage user access to computational resources. The access control information may comprise authentication methods or procedures, authentication credential information, user access permissions, security policies, and authorization levels. The access control information may be stored in a centralized or distributed database and may be dynamically updated based on user interactions, policy changes, or security requirements. The authentication controller system may be configured to retrieve and process access control information to determine authentication protocols applicable to a specific user, computational resource, or task request.

The trusted computing compiler may retrieve authentication data from the access control information database and verify the assigned user's authorization based on the authentication procedure associated with the identified computational resource and the assigned secondary user's authorization based on the authentication procedure associated with the identified secondary computational resource. Upon successful authentication, the compiler generates the digital token comprising at least one cryptographic credential that encodes entity identification data, access permissions, authentication status, and authorization constraints, such as using asymmetric encryption (e.g., Rivest-Shamir-Adleman (RSA), Elliptic Curve Cryptography (ECC)) or Hash-Based Message Authentication Code (HMAC). In that way, the digital token is digitally signed by the trusted computing compiler to ensure data integrity and securely distributed to the identified computational resource and the identified secondary computational resource.

In some embodiments, the digital token is configured to expire upon predefined threshold is identified. The expiration may be enforced based on time-based constraints, task completion status, system-triggered revocation events, or a combination of these expiration factors. The time-based constraints may be determined based on an AI-based task simulation that estimates the total processing time of the task request using process mapping information and system engagement logs associated with the task request. Upon expiration of the predefined time, the digital token is invalidated. The task completion status may be updated through a predefined process executed by the assigned user or the additional assigned user as the task request is processed. The digital token is invalidated upon confirmation of task request completion.

The system-triggered revocation events may comprise, but are not limited to, task request cancellation, wherein the system determines that the task request has been canceled due to operational constraints, administrative override, and/or the like; computational resource instability, wherein the system detects instability, failure, or unavailability of the computational resource or the additional computational resource, necessitating restriction or revocation of access to prevent potential security concern, data corruption, or operational inefficiencies; security policy enforcement, wherein anomalous activity, unauthorized access attempts, or a security violation is detected in relation to the assigned user, the additional assigned user, or the computational resource, triggering an automated revocation of access; resource reallocation, wherein the system determines that the computational resource or additional computational resource must be reallocated based on workload distribution, system maintenance schedules, dynamic operational demands, or optimization strategies; violates system-imposed constraints, or reaches a predefined threshold that mandates termination of access; and administrative intervention, wherein a verified system administrator or an external control entity initiates a revocation request based on security, compliance, or operational directives.

Moreover, and in some embodiments, the trusted computing compiler may be configured to update or renew the digital token in response to security policy changes, detected anomalies, access violations, a requirement to exchange the assigned user or additional assigned user, a request from a verified administrating system, and/or other predefined condition.

In certain embodiments, the digital token may be stored in a secure enclave, distributed ledger, or cryptographic key management system to prevent unauthorized tampering and ensure auditability. The system may further include a validation mechanism wherein the computational resource verifies the digital token before granting access to the assigned user.

In some embodiments, the trusted computing compiler is configured to detect an access request to an unauthorized computational resource using the digital token. Upon detection of such an access request, the trusted computing compiler is further configured to generate an unauthorized access report associated with the access request. The unauthorized access report may comprise requestor-related information, details of the unauthorized computational resource being accessed, the timestamp of the access attempt, the authentication credentials presented, and the reason for access denial. In certain embodiments, the trusted computing compiler may be configured to transmit the unauthorized access report to a security monitoring system, an administrative control system, or a predefined security log repository for further analysis, policy enforcement, or audit purposes.

In some embodiments, the multimodal AI-based authentication controller system may be configured to generate process mapping information and at least one system engagement log associated with a task request and store the process mapping information and the system engagement log for future use. The process mapping information and the system engagement log may be stored in a secure database, or a dedicated log management system either internally within the multimodal AI-based authentication controller system or externally in an external storage infrastructure, wherein the stored data may be retrieved for auditing, security analysis, performance optimization, and predictive modeling. The stored system engagement log may al so be used by the AI-based task simulation, hierarchical decision model, or clustered decision-making model to enhance future task request processing, optimize resource allocation, and refine authentication protocols.

FIG. 4 illustrates an example multimodal authentication controller system diagram 400, in accordance with an embodiment of the disclosure. The multimodal AI-based authentication controller system 400 may comprise ticket management module 402, incident management module 404, service request management module 406, release task management module 408, system engagement model database 410, AI-based task simulation engine 412, hierarchical decision model engine 414, clustered decision-making model engine 416, trusted computing compiler 418, digital token 420, user expertise database 422, system record database 424 and trusted computing database 426.

The ticket management module 402 identifies task request and generates a ticket associated with the task request. The ticket management module may comprise sub-modules each having a different receiving source and addressing different aspects of the task request, such as incident management module 404, service request management module 406, release task management module 408.

The system engagement model database 410 may comprise process mapping information and system engagement logs of the past tasks. The AI-based task simulation engine 412 may access to the system engagement model database 410 to receive the process mapping information and the system engagement logs of the past tasks associated with the tasks that is extracted from the ticket received from the management module 402.

The AI-based task simulation engine 412 may be configured to simulate the task request to identify at least one computational resource for processing the task request based on historical process mapping information and system engagement logs retrieved from the system engagement model database 410. Furthermore, the AI-based task simulation engine 412 may be configured to access the user expertise database 422 to retrieve a user's SME index score in order to identify at least one user for each of the identified computational resource.

The user expertise database 422 may comprise records of users, such as past engagement records to task requests, user availability for the computational resource, user's the SME index score to computational resources, user's authorization to access and utilize the computational resources, and/or the like.

The system record database 424 may store computational resource dependency maps. The hierarchical decision model engine 414 may be configured to access to the system record database 424 in order to identify secondary computational resource using a decision tree algorithm and the resource dependency map associated with the identified computational resource. Moreover, the hierarchical decision model engine 414 may be configured to access the user expertise database 422 to retrieve a user's SME index score in order to identify at least one secondary user for each identified secondary computational resource.

The clustered decision-making model engine 416 may be configured to determine at least one assigned user from one or more identified user and at least one assigned secondary user from one or more identified secondary user. The engine may be configured to utilize a cluster bandits algorithm to determine optimal user for each of the identified computational resource and optimal secondary user for each of the identified secondary computational resource, based on a number of required users and parameters retrieved from the user expertise database 422, such as past user engagement records of the past tasks or similar past tasks associated with the current identified tasks, user availability for the computational resource, and/or the like.

The trusted computing database 426 may be configured to store access control information. The access control information may comprise authentication methods or procedures, authentication credential information, user access permissions, security policies, and authorization levels. The trusted computing compiler 418 may be configured to retrieve authentication procedures for the assigned user and the additional assigned user from the trusted computing database 426 to generate a digital token 420, wherein the digital token is digitally signed using a cryptographic credential and is exclusively associated with the ticket. The digital token 420 may be configured to expire upon completion of the task request or at a predefined time, thereby ensuring that users have access to the computational resources for a limited duration.

In some embodiments, certain components may be implemented as an external database, module, or system, wherein the multimodal AI-based authentication controller system 400 may be configured to access and retrieve data or functions from such external components to manage user authentication. For example, the ticket management module 402, system engagement model database 410, user expertise database 422, system record database 424, or trusted computing database 426 may be implemented internally within the system or externally in an external infrastructure.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for multimodal artificial intelligence (AI)-based authentication controller, the system comprising:

a memory device with computer-readable program code stored thereon; and at least one processing device operatively coupled to the at least one memory device, wherein executing the computer-readable program code is configured to cause the at least one processing device to:

identify a ticket for a task request, wherein the ticket stores tasks associated with the task request for completion of computational resource management that requires timed authorized access to computational resource within a network environment;

identify all tasks on the network environment for the task request of the ticket and simulate all the tasks, via an AI-based simulation, to determine computational resources to perform all the tasks;

identify secondary computational resources via a hierarchical decision model, wherein the secondary computational resources have interdependencies or hierarchical relationships with the computational resources to perform all the tasks;

assign at least one user to each of the identified computational resources and each of the identified secondary computational resources via a clustered decision-making model; and generate a token with timed authentication access for all the assigned users to the assigned computational resources or the assigned secondary computational resources to complete all the tasks, wherein the token is configured to expires upon completion of the computational resource management.

2. The system of claim 1, wherein the ticket is generated from a ticket management module that is configured to receive the task request and to store tasks associated with the task request, wherein the task request comprises completion of computational resource management comprising an unexpected failure, a service-oriented request, or a planned activity associated with the computational resource management within the network environment.

3. The system of claim 1, wherein the AI-based simulation is using process mapping data and system engagement log data from past tasks associated with all the tasks, wherein the process mapping data comprises procedural pathways and sequences of the past tasks, wherein the system engagement log data comprises activity records of the computational resources of the past tasks.

4. The system of claim 1, wherein the AI-based simulation is further configured to identify at least one user for each of the identified computational resource based on a subject matter expert (SME) index score and an authorization to access and utilize the corresponding identified computational resource, wherein the hierarchical decision model is further configured to identify at least one secondary user for each of the identified secondary computational resource based on the SME index score and an authorization to access and utilize the corresponding identified secondary computational resource, wherein the SME index score represents the level of the user's expertise in relation to the computational resource or the secondary computational resource, wherein the clustered decision-making model is further configured to assign at least one user for the corresponding identified computational resource from the at least one identified user and assign at least one secondary user for the corresponding identified secondary computational resource from the at least one identified secondary user.

5. The system of claim 1, wherein the hierarchical decision model is pretrained with a decision tree model using computational resource dependency maps comprising information of the interdependencies or the hierarchical relationships between computational resources within the network environment.

6. The system of claim 1, wherein the clustered decision-making model is further configured to assign at least one user to each of the identified computational resources and to each of the identified secondary computational resources based on parameters to the assigned computational resource or the assigned secondary computational resource, wherein the parameters comprises a user's availability, an a SME index score, an authorization to access and utilize, or a record of the assigned user from past tasks associated with all the tasks.

7. The system of claim 6, wherein the clustered decision-making model is pretrained with a cluster bandits model.

8. The system of claim 1, wherein the token is configured to expire at a predefined time, the predefined time being determined by the AI-based task simulation.

9. The system of claim 1, wherein the token is generated via a trusted computing compiler, wherein the trusted computing compiler is configured to:

identify procedures of authentication for the identified computational resources and for the identified secondary computational resources; and generate the token with timed authentication access for all the assigned users to the assigned computational resources or the assigned secondary computational resources to complete all the tasks based on the identified procedures of authentication.

10. The system of claim 9, wherein the trusted computing compiler is further configured to:

detect an access request to an unauthorized computational resource with the token; and generate an unauthorized access report associated with the access request.

11. A computer program product for multimodal artificial intelligence (AI)-based authentication controller system, wherein the computer program product comprises at least one non-transitory computer-readable medium having computer-readable program code portion embodied therein, the computer-readable program code portions which when executed by a processing device are configured to cause a processor to:

identify a ticket for a task request, wherein the ticket stores tasks associated with the task request for completion of computational resource management that requires timed authorized access to computational resource within a network environment;

identify all tasks on the network environment for the task request of the ticket and simulate all the tasks, via an AI-based simulation, to determine computational resources to perform all the tasks;

identify secondary computational resources via a hierarchical decision model, wherein the secondary computational resources have interdependencies or hierarchical relationships with the computational resources to perform all the tasks;

assign at least one user to each of the identified computational resources and each of the identified secondary computational resources via a clustered decision-making model; and generate a token with timed authentication access for all the assigned users to the assigned computational resources or the assigned secondary computational resources to complete all the tasks, wherein the token is configured to expires upon completion of the computational resource management.

12. The computer program product of claim 11, wherein the AI-based simulation is using process mapping data and system engagement log data from past tasks associated with all the tasks, wherein the process mapping data comprises procedural pathways and sequences of the past tasks, wherein the system engagement log data comprises activity records of the computational resources of the past tasks.

13. The computer program product of claim 11, wherein the hierarchical decision model is pretrained with a decision tree model using computational resource dependency maps comprising information of the interdependencies or the hierarchical relationships between computational resources within the network environment.

14. The computer program product of claim 11, wherein the clustered decision-making model is pretrained with a cluster bandits model and is further configured to assign at least one user to each of the identified computational resources and to each of the identified secondary computational resources based on parameters to the assigned computational resource or the assigned secondary computational resource, wherein the parameters comprises a user's availability, an a SME index score, an authorization to access and utilize, or a record of the assigned user from past tasks associated with all the tasks.

15. The computer program product of claim 11, wherein the token is generated via a trusted computing compiler, wherein the trusted computing compiler is configured to:

identify procedures of authentication for the identified computational resources and for the identified secondary computational resources; and generate the token with timed authentication access for all the assigned users to the assigned computational resources or the assigned secondary computational resources to complete all the tasks based on the identified procedures of authentication.

16. A computer-implemented method for multimodal artificial Intelligence (AI)-based authentication controller system, the method comprising:

identifying a ticket for a task request, wherein the ticket stores tasks associated with the task request for completion of computational resource management that requires timed authorized access to computational resource within a network environment;

identifying all tasks on the network environment for the task request of the ticket and simulate all the tasks, via an AI-based simulation, to determine computational resources to perform all the tasks;

identifying secondary computational resources via a hierarchical decision model, wherein the secondary computational resources have interdependencies or hierarchical relationships with the computational resources to perform all the tasks;

assigning at least one user to each of the identified computational resources and each of the identified secondary computational resources via a clustered decision-making model; and generating a token with timed authentication access for all the assigned users to the assigned computational resources or the assigned secondary computational resources to complete all the tasks, wherein the token is configured to expires upon completion of the computational resource management.

17. The computer-implemented method of claim 16, wherein the AI-based simulation is using process mapping data and system engagement log data from past tasks associated with all the tasks, wherein the process mapping data comprises procedural pathways and sequences of the past tasks, wherein the system engagement log data comprises activity records of the computational resources of the past tasks.

18. The computer-implemented method of claim 16, wherein the hierarchical decision model is pretrained with a decision tree model using computational resource dependency maps comprising information of the interdependencies or the hierarchical relationships between computational resources within the network environment.

19. The computer-implemented method of claim 16, wherein the clustered decision-making model is pretrained with a cluster bandits model and is further configured to assign at least one user to each of the identified computational resources and to each of the identified secondary computational resources based on parameters to the assigned computational resource or the assigned secondary computational resource, wherein the parameters comprises a user's availability, an a SME index score, an authorization to access and utilize, or a record of the assigned user from past tasks associated with all the tasks.

20. The computer-implemented method of claim 16, wherein the token is generated via a trusted computing compiler, wherein the trusted computing compiler is configured to:

identify procedures of authentication for the identified computational resources and for the identified secondary computational resources; and generate the token with timed authentication access for all the assigned users to the assigned computational resources or the assigned secondary computational resources to complete all the tasks based on the identified procedures of authentication.

* * * * *